United States Patent [19]

Schreurs

[11] 4,147,816

[45] Apr. 3, 1979

[54] METHOD OF IMPROVING THE OUTPUT AND MAINTENANCE OF A FLUORESCENT LAMP

[75] Inventor: Willy P. Schreurs, Danvers, Mass.

[73] Assignee: GTE Sylvania Incorporated, Danvers, Mass.

[21] Appl. No.: 785,463

[22] Filed: Apr. 7, 1977

Related U.S. Application Data

[63] Continuation of Ser. No. 634,959, Nov. 24, 1975, abandoned.

[51] Int. Cl.² .................. B05D 5/06; B05D 7/22; H01J 61/35
[52] U.S. Cl. ............................... 427/67; 427/157; 427/106; 427/372 R
[58] Field of Search ............ 427/67, 157, 372, 372 R; 252/301.4 H, 301.4 R, 301.4 F; 313/221

[56] References Cited

U.S. PATENT DOCUMENTS

| 2,587,592 | 3/1952 | Butler | 252/301.4 F |
| 2,597,631 | 5/1952 | Froelich | 252/301.4 F |
| 3,679,452 | 7/1972 | Ropp | 427/67 |

*Primary Examiner*—Michael F. Esposito
*Attorney, Agent, or Firm*—James Theodosopoulos

[57] ABSTRACT

In the manufacture of a fluorescent lamp having lead activated barium mesosilicate phosphor coated on the inner wall of the lamp envelope, ammonium chloride or other heat decomposable chlorides are added to the phosphor coating suspension in order to improve the initial output and the maintenance of the lamp.

5 Claims, No Drawings

METHOD OF IMPROVING THE OUTPUT AND MAINTENANCE OF A FLUORESCENT LAMP

This is a continuation of application Ser. No. 634,959, filed Nov. 24, 1975, now abandoned.

THE INVENTION

This invention concerns fluorescent lamps. Such lamps are low pressure mercury arc discharge devices which have electrodes at each end of an elongated glass envelope and which contain a phosphor coating on the inner surface of the glass envelope. The invention is particularly concerned with lamps utilizing lead activated barium mesosilicate phosphor. This phosphor is an ultraviolet emitting phosphor peaking at about 351 nanometers.

I have found that in such lamps the initial output and the maintenance can be significantly improved by adding a heat decomposable or vaporizable chloride, for example, ammonium chloride, to the phosphor coating suspension. I believe that the chloride improves lamp performance by eliminating any lead oxide that may occur during lamp processing, particularly during the lehring operation. The lead activator in the phosphor has a tendency to become oxidized during the lehring operation and to form a film of yellow PbO on the surface of the phosphor crystals. Although the amount of PbO formed is very small, it is nevertheless sufficient to cause a shift of approximately 3 nanometers in the peak of the emission due to the filtering effect. The $NH_4Cl$ addition according to the invention reacts readily with the PbO to form $PbCl_2$ which is sufficiently volatile at the lehring temperature of approximately 650° C. to be eliminated from the surface of the phosphor film.

The barium mesosilicate phosphor can be prepared by conventional methods in which typical raw mix constituents, such as $BaCO_3$, $H_2SiO_3$, $BaCl_2$ and Pb acetate, are mixed together in proportions to satisfy the phosphor formulation corresponding to $BaSiO_5:Pb_{.03}F_{.09}$ and fired in silica crucibles at temperatures ranging from 1000 to 1100° C. for 4 to 8 hours. After cooling, the phosphor is ball-milled in water for 2 hours and filtered to remove the excess water. The wet cake is resuspended in a conventional water-base vehicle to which is added $NH_4Cl$ in amounts ranging between 0.5 and 5%, and preferably 2% by weight of the dry phosphor. The resulting suspension may also include the usual wetting and defoaming agents known in the art and is used to coat the fluorescent bulbs in the conventional manner.

After drying, the bulbs are lehred for approximately 3 minutes at a temperature ranging between about 600° and 650° C. and the lamps are finished in the conventional manner.

As a specific but non-limitative example according to the invention, 400 grams of lead activated barium mesosilicate phosphor were milled for 2 hours in a pebble mill containing 600 ml of deionized water.

After milling, the water suspension was filtered under vacuum and the cake was resuspended in 1000 ml of 5.4% polyoxyethylene vehicle diluted with 300 ml deionized water and containing 2.4 grams of fumed aluminum oxide as adherence promoter.

The resulting suspension was divided into three equal portions, the first one being used as control. To the other two portions were added respectively 1.35 and 2.7 grams $NH_4Cl$ corresponding to 1 and 2% by weight of dry phosphor.

These suspensions were used to coat fluorescent 4CT12 lamps which gave the following results in relative units of ultraviolet emission:

|  | 0 Hour | 100 Hours | 1000 Hours |
|---|---|---|---|
| Control (no addition) | 14.352 | 11,248 | 9,213 |
| 1% $NH_4Cl$ Addition | 17,052 | 14,128 | 10,941 |
| 2% $NH_4Cl$ Addition | 17,136 | 14,660 | 11,885 |

It can be seen that the chloride additions increased the initial output from 14,352 to over 17,000, an increase of more than 18%.

A similar test was conducted in 48T12-VHO lamps giving the following values:

|  | 0 Hour | 5000 Hours | 1000 Hours | 1000 Hours Maintenance |
|---|---|---|---|---|
| Control (no addition) | 28,125 | 17,428 | 13,499 | 47.8% |
| 2% $NH_4Cl$ Addition | 32,353 | 24,905 | 19,705 | 60.9% |

In this test the chloride addition increased initial output by 15% and also increased the 100 hour maintenance by 13%.

When the suspension used to coat the phosphor is organic solvent based, instead of water-base, the heat decomposable or vaporizable chloride can comprise an organic chloride which is soluble in the solvent.

I claim:

1. The method of manufacturing a fluorescent lamp comprising the steps of: preparing a lead-activated barium mesosilicate phosphor suspension containing a heat decomposable chloride dissolved therein which can prevent formation of lead oxide during lehring; applying said suspension to the envelope of the lamp in order to deposit a phosphor coating thereon; and processing the phosphor coated envelope into a finished lamp including the step of lehring said phosphor coated envelope.

2. The method of claim 1 wherein said chloride is vaporizable at the lehring temperature.

3. The method of claim 2 wherein said lehring temperature is about 600° to 650° C.

4. The method of claim 2 where said chloride is ammonium chloride.

5. The method of claim 4 wherein the ammonium chloride comprises from about 0.5 to 5% of the weight of the phosphor.

* * * * *